United States Patent
Zhu et al.

(10) Patent No.: US 12,112,241 B2
(45) Date of Patent: Oct. 8, 2024

(54) SYSTEMS AND METHODS FOR DETECTING AND GROUPING ANOMALIES IN DATA

(71) Applicant: CABLE TELEVISION LABORATORIES, INC., Louisville, CO (US)

(72) Inventors: Jingjie Zhu, Erie, CO (US); Karthik Sundaresan, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1278 days.

(21) Appl. No.: 16/577,699

(22) Filed: Sep. 20, 2019

(65) Prior Publication Data

US 2020/0097852 A1    Mar. 26, 2020

Related U.S. Application Data

(60) Provisional application No. 62/733,788, filed on Sep. 20, 2018, provisional application No. 62/733,765, filed on Sep. 20, 2018.

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
CPC ... H04B 3/46; H04L 63/1425; H04L 43/0823; G06N 20/00; G06F 17/18
See application file for complete search history.

(56) References Cited

U.S. PATENT DOCUMENTS

| | | | |
|---|---|---|---|
| 2008/0167837 A1* | 7/2008 | Basak | G06F 18/00 702/179 |
| 2015/0341379 A1* | 11/2015 | Lefebvre | H04L 43/0894 726/22 |
| 2017/0310541 A1* | 10/2017 | Jin | H04L 67/1097 |
| 2018/0294941 A1* | 10/2018 | Chapman | H04B 3/487 |
| 2019/0155672 A1* | 5/2019 | Wang | G06F 11/0709 |
| 2019/0205771 A1* | 7/2019 | Lin | G06F 40/30 |
| 2019/0379589 A1* | 12/2019 | Ryan | G06N 3/082 |
| 2020/0053110 A1* | 2/2020 | Wan | H04L 67/535 |

(Continued)

OTHER PUBLICATIONS

Basu et al., "Automatic outlier detection for time series: an application to sensor data," Knowl Inf Syst (2007) 11(2): 137-154 (Year: 2007).*

(Continued)

*Primary Examiner* — Miranda M Huang
*Assistant Examiner* — Yao David Huang
(74) *Attorney, Agent, or Firm* — Elevated IP, LLC

(57) ABSTRACT

The present disclosure generally relates to apparatus, software and methods for detecting anomalous elements in data. For example, the data can be any time series, such as but not limited to radio frequency data, temperature data, stock data, or production data. Each type of data may be susceptible to repeating phenomena that produce recognizable features of anomalous elements. In some embodiments, the features can be characterized as known patterns and used to train a machine learning model via supervised learning to recognize those features in a new data series.

18 Claims, 14 Drawing Sheets

(56) References Cited

U.S. PATENT DOCUMENTS

2020/0233774 A1* 7/2020 Toledano ............ G06F 11/3447

OTHER PUBLICATIONS

Ibidunmoye et al., "Adaptive Anomaly Detection in Performance Metric Streams," in IEEE Transactions on Network and Service Management, vol. 15, No. 1, pp. 217-231, Mar. 2018 (Year: 2018).*
Lane, "Median and Mean," onlinestatbook.com. Archived Jan. 20, 2018. Retrieved from <https://web.archive.org/web/20180120021201/https://onlinestatbook.com/2/summarizing_distributions/mean_median_def.html> (Year: 2018).*
Zhang et al., "A method to detect and mitigate radio frequency interference of aquarius data," 2017 IEEE International Geoscience and Remote Sensing Symposium (IGARSS), Fort Worth, TX, USA, 2017, pp. 1274-1276. (Year: 2017).*

\* cited by examiner

SYSTEMS AND METHODS FOR DETECTING AND GROUPING ANOMALIES IN DATA

CROSS-REFERENCE TO RELATED APPLICATIONS

This application claims the benefit of and priority to U.S. Provisional Patent Application Nos. 62/733,765, filed Sep. 20, 2018, and 62/733,788, filed Sep. 20, 2018, each of which is hereby incorporated herein by reference in its entirety.

STATEMENT REGARDING FEDERALLY SPONSORED RESEARCH

None.

BACKGROUND

One-dimensional data, such as time series including temperature data, stock data, manufacturing data, radio frequency data and the like, provide valuable information when analyzed, but few methods exist for quickly recognizing and characterizing anomalous elements, trends and patterns within one-dimensional data.

Further, as data sets become larger, the amount of time and resources devoted to data analysis can rapidly become cost-prohibitive. For example, DOCSIS 3.1 is being massively deployed, and the cable industry is receiving much more data than ever before. Imagine there are millions of DOCSIS 3.1 cable modems (CMs) deployed in the field and the data collection systems collect proactive network maintenance (PNM) data from each CM. One million DOCSIS 3.1 CMs can generate 24 million downstream modulation error ratio (RxMER) samples every day if the capture interval is 1 hour, and in 1-2 months the number of RxMER data files can easily reach 1 billion. With this much data, it is difficult to target groups of CMs suffering from similar problems.

SUMMARY

The present disclosure generally relates to apparatus, software and methods for detecting anomalous elements in one-dimensional data. For example, the data can be any time series, such as but not limited to radio frequency data, temperature data, stock data, production data, signal to noise ratio (SNR) over time data, modulation error ratio (MER) data, full band capture data, vibration sensor data, humidity data, voltage data, electrical current data, pH value over time data, motion sensor data and the like. Each type of data may be susceptible to repeating phenomena that produce recognizable features of anomalous elements. In some embodiments, the features can be characterized as known patterns and used to train a machine learning model via supervised learning to recognize those features in a new data series.

In an embodiment, the apparatus, software and methods disclosed herein detect anomalous elements in spectral data for a cable network. For example, the spectral data may be radio frequency data, optical data, electrical data or combinations thereof. In one instantiation, the spectral data is download modulation error ratio (Rx MER) data from a digital transmitter, where data analysis is expedited by removing the majority of good CM data samples and keeping only the data samples having problematic features.

In an aspect, a method for detecting anomalous elements in data comprises: optionally smoothing a data series; detrending a (smoothed) data series to obtain an un-tilted data series; designating a number of elements within the un-tilted data series as a sliding window; moving the sliding window in increments across the un-tilted data series; calculating a median and a standard deviation for the sliding window at each increment; when the standard deviation for the sliding window is greater than a threshold (SD threshold), identifying anomalous elements within the sliding window; and scoring the data series based on a quantity of the anomalous elements, a magnitude of the anomalous elements, or both a quantity and a magnitude of the anomalous elements.

In an embodiment, the data is a time series (i.e., data as a function of time or data accumulated over time). In an embodiment, the data is radio frequency data, temperature data, stock data, production data, signal to noise ratio (SNR) over time data, modulation error ratio (MER) data, full band capture data, vibration sensor data, humidity data, voltage data, electrical current data, pH value over time data, motion sensor data, etc.

In an embodiment, the data is instantaneous or the data is a combination (e.g., an average) of samples acquired over time.

In an embodiment, the step of identifying anomalous elements comprises: determining a squared error between the median for the sliding window and each element within the sliding window; setting a threshold for the squared error (SE threshold); and identifying elements exceeding the SE threshold as anomalous elements.

In an embodiment, the magnitude of anomalous elements is a mean, a median or a sum of all the squared errors exceeding the SE threshold. Other functions to quantify the magnitude of anomalous elements can include cubic functions.

In an embodiment, the quantity of anomalous elements is a weighted average or a sum of all the anomalous elements.

In an embodiment, a method for detecting anomalous elements in data further comprises replacing the anomalous elements with the median of the sliding window to obtain a modified data series, calculating a new median and a new standard deviation for the sliding window based on the modified data series, and identifying new anomalous elements within the sliding window when the new standard deviation is greater than a new SD threshold, wherein the scoring occurs on the modified data series based on the new anomalous elements.

In an embodiment, the step of identifying anomalous elements comprises identifying an element that exceeds the SD threshold as an anomalous element.

In an embodiment, the SD threshold and the new SD threshold are the same or different.

In an embodiment, a method for detecting anomalous elements in data further comprises classifying the data series as being a patterned data series comprising a feature when the score exceeds a set value. For example, the feature may be selected from the group consisting of LTE ingress, an MER spike, amplifier suckout, frequency roll-off, wireless interference patterns and combinations thereof.

In an embodiment, a method for detecting anomalous elements in data further comprises grouping a plurality of the patterned data series into one or more clusters.

In an embodiment, a method for detecting anomalous elements in data further comprises identifying one or more cable modems transmitting the patterned data series.

In an embodiment, a method for detecting anomalous elements in data further comprises using the patterned data series to train a machine learning model.

In an embodiment, a method for detecting anomalous elements in data further comprises normalizing the un-tilted data series.

In an embodiment, detrending comprises substantially removing one or more slope(s) of the data series.

In an aspect, a non-transitory computer-readable medium has a plurality of non-transitory instructions executable with a processor for detecting anomalous elements in data, the plurality of non-transitory instructions being executable for: optionally smoothing a data series; detrending a (smoothed) data series to obtain an un-tilted data series; designating a number of elements within the un-tilted data series as a sliding window; moving the sliding window in increments across the un-tilted data series; calculating a median and a standard deviation for the sliding window at each increment; when the standard deviation for the sliding window is greater than a threshold (SD threshold), identifying anomalous elements within the sliding window; and scoring the data series based on a quantity of the anomalous elements, a magnitude of the anomalous elements, or both a quantity and a magnitude of the anomalous elements.

In an embodiment, the plurality of non-transitory instructions are executable for determining a squared error between the median for the sliding window and each element within the sliding window; setting a threshold for the squared error (SE threshold); and identifying elements exceeding the SE threshold as anomalous elements.

In an embodiment, the plurality of non-transitory instructions are executable for replacing the anomalous elements with the median of the sliding window to obtain a modified data series, calculating a new median and a new standard deviation for the sliding window based on the modified data series, and identifying new anomalous elements within the sliding window when the new standard deviation is greater than a new SD threshold, wherein the scoring occurs on the modified data series based on the new anomalous elements.

In an embodiment, the plurality of non-transitory instructions are executable for classifying the data series as being a patterned data series comprising a feature when the score exceeds a set value.

In an embodiment, the plurality of non-transitory instructions are executable for grouping a plurality of the patterned data series into one or more clusters.

In an embodiment, the plurality of non-transitory instructions are executable for identifying one or more cable modems transmitting the patterned data series.

In an embodiment, the plurality of non-transitory instructions are executable for using the patterned data series to train a machine learning model.

In an embodiment, the plurality of non-transitory instructions are executable for normalizing the un-tilted data series.

BRIEF DESCRIPTION OF THE DRAWINGS

Illustrative embodiments of the present invention are described in detail below with reference to the attached drawings.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, "one-dimensional data" refers to a one-dimensional or linear array of data points.

As used herein, the term "network" refers generally to any type of telecommunications or data network including, without limitation, hybrid fiber coaxial (HFC) networks, satellite networks, telco networks, and data networks (including MANs, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, proactive network maintenance (PNM) data is any data useful for detect impending failure conditions on a network, such as but not limited to bandwidth demand, collision frequency, time of day, temperature, other environmental conditions, location of a device, movement of a failure condition (transience), and the like.

As used herein, modulation error ratio (MER) data quantifies the performance of a digital transmitter or receiver in a network. For example, imperfect digital signals may include noise, carrier suppression, distortion and other features that can be observed when the digital signal is demodulated. Thus, MER data may be characterized as one type of PNM data.

Figure 1:
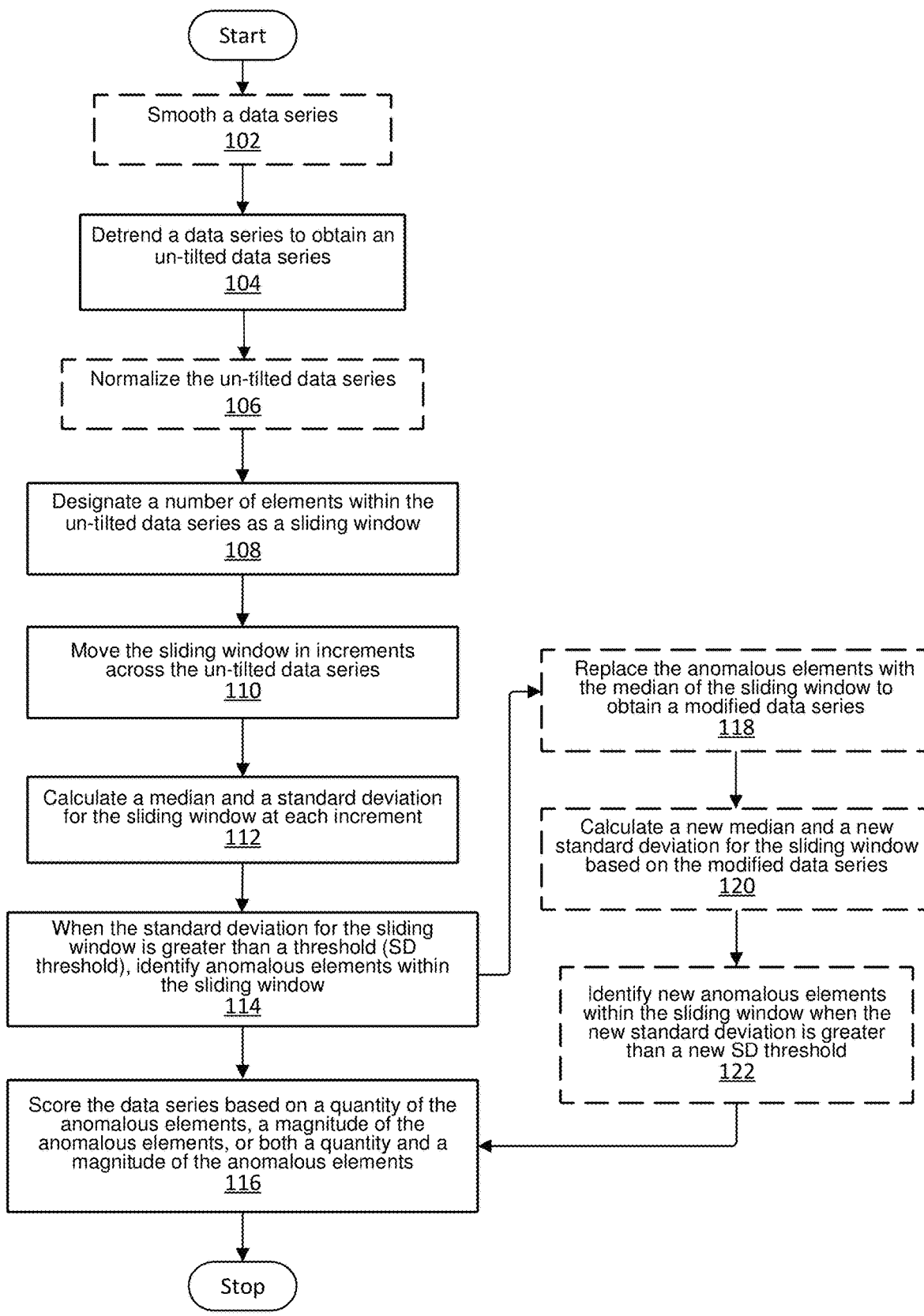
FIG. 1 is a flowchart illustrating steps in a method for detecting anomalous elements in data, according to an embodiment.

FIG. 1 is a flowchart illustrating steps in a method for detecting anomalous elements in one-dimensional data. In optional step 102, a data series is smoothed. In step 104, the optionally smoothed data series is detrended to obtain an un-tilted data series. In optional step 106, the un-tilted data series is normalized. In step 108, a number of elements within the un-tilted data series is designated as a sliding window. In step 110, the sliding window is moved in increments across the un-tilted data series. In step 112, a median and a standard deviation are calculated for the sliding window at each increment. In step 114, when the standard deviation for the sliding window is greater than a threshold (SD threshold), anomalous elements within the sliding window are identified. In step 116, the data series is scored based on a quantity of the anomalous elements, a magnitude of the anomalous elements, or both a quantity and a magnitude of the anomalous elements.

In optional step 118, the anomalous elements identified in step 114 are replaced with the median of the sliding window to obtain a modified data series, then a new median and a new standard deviation are calculated for the sliding window based on the modified data series, in step 120. In step 122, new anomalous elements within the sliding window are identified when the new standard deviation is greater than a new SD threshold, and the scoring in step 116 occurs on the modified data series based on the new anomalous elements.

Figure 2:
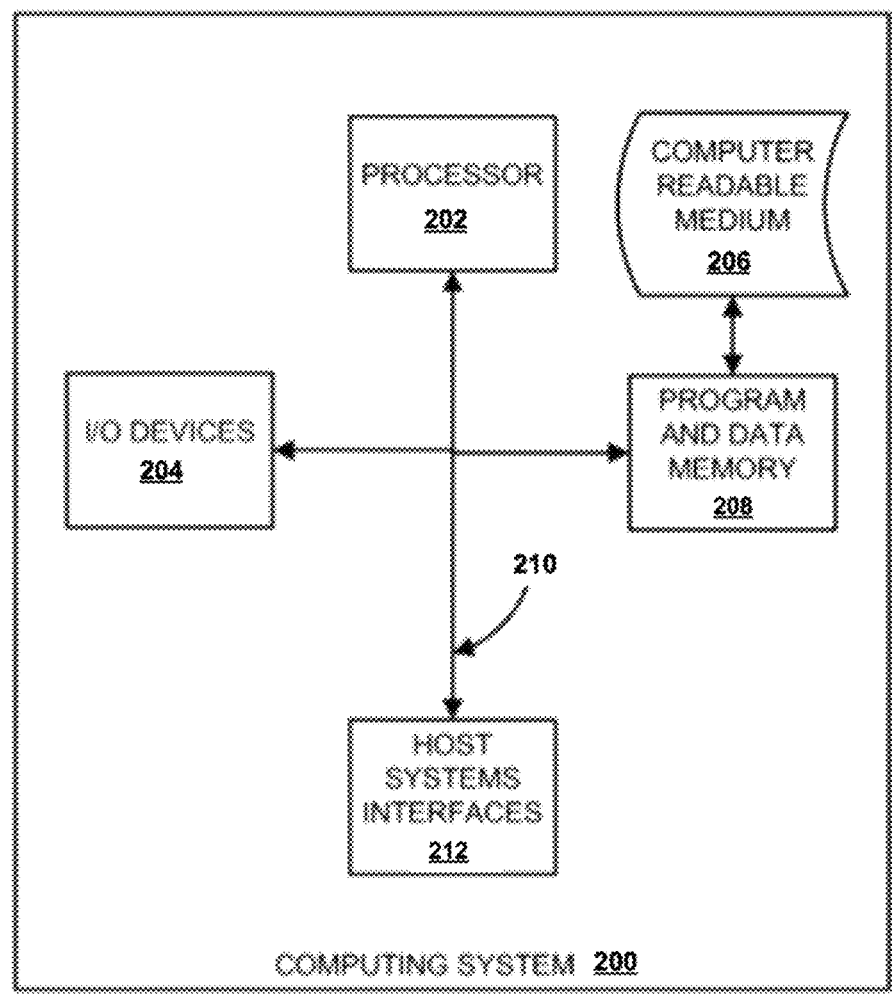
FIG. 2 is a block diagram of an exemplary computing system in which a computer readable medium provides instructions for performing methods described herein.
Figure 3:
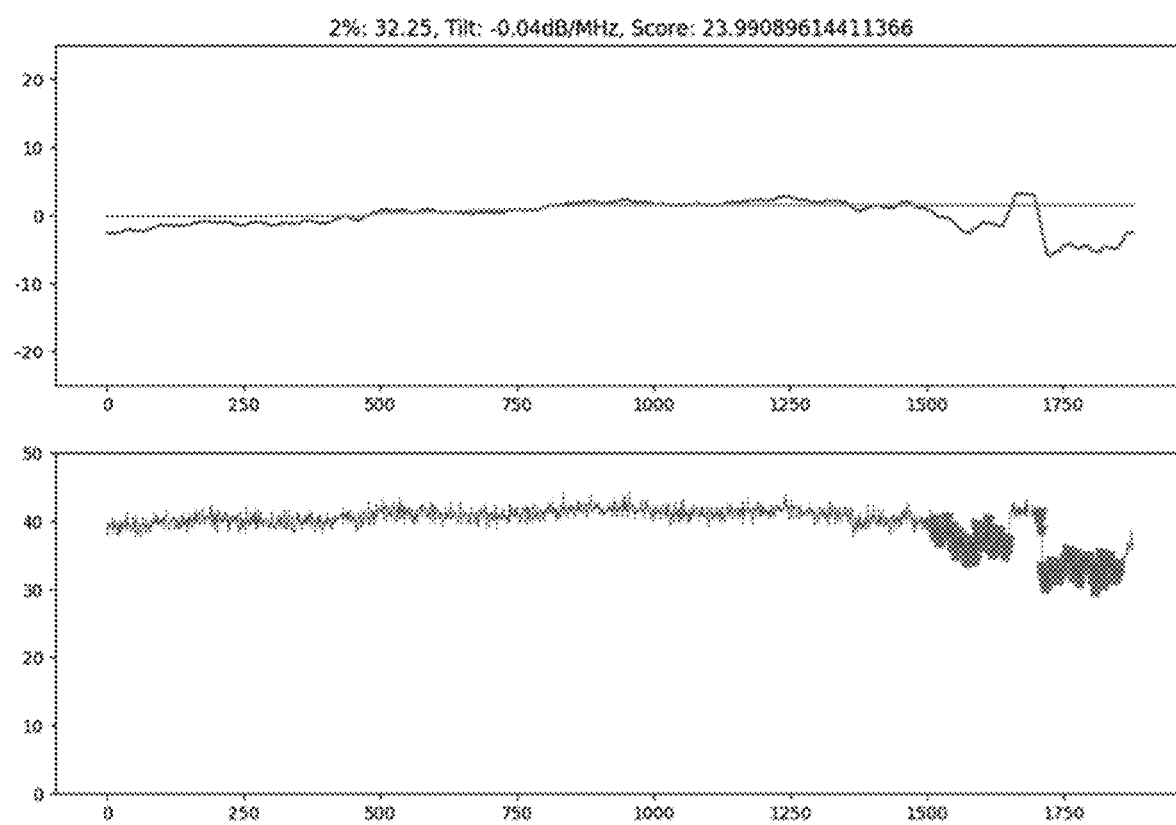
FIGS. 3, 4, 5, 6, 7, 8, 9, 10, 11 and 12 show graphs of actual network data with detrending lines drawn (top) and data elements within anomalous features marked (bottom), according to multiple embodiments.
Figure 4:
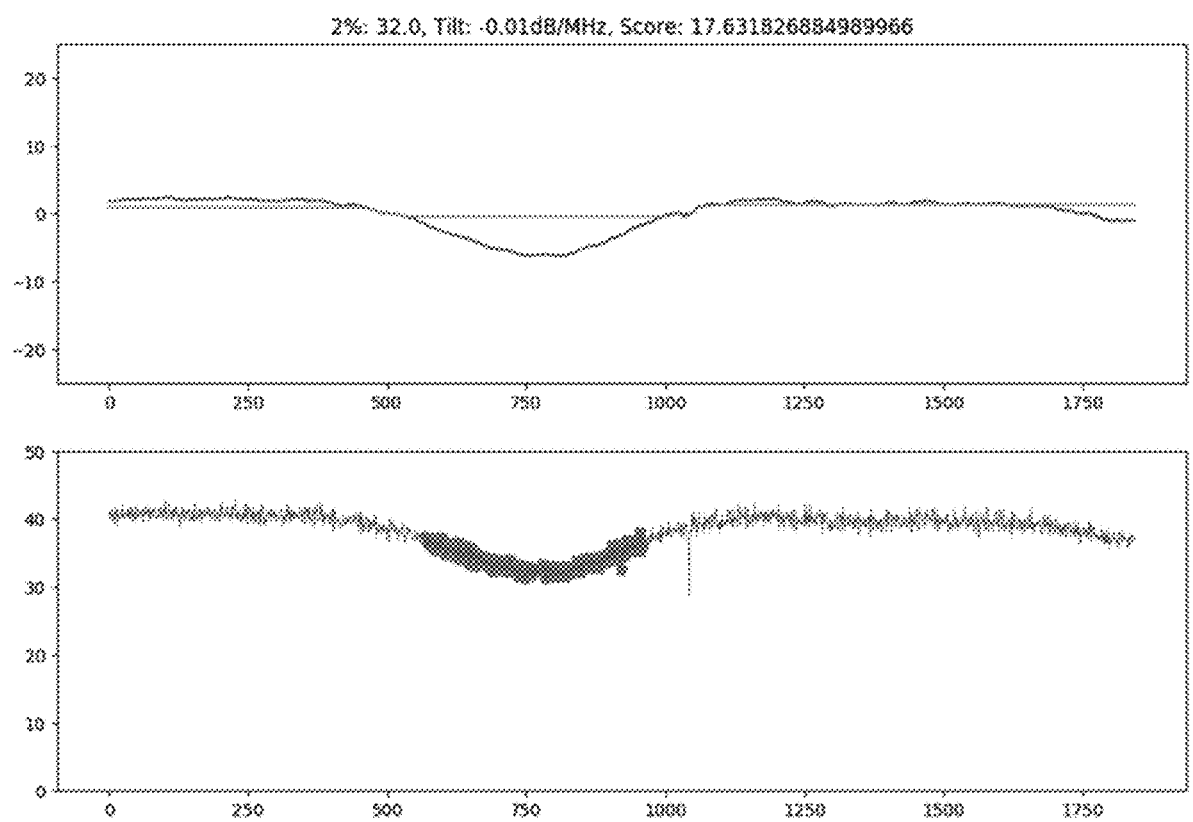
Figure 5:
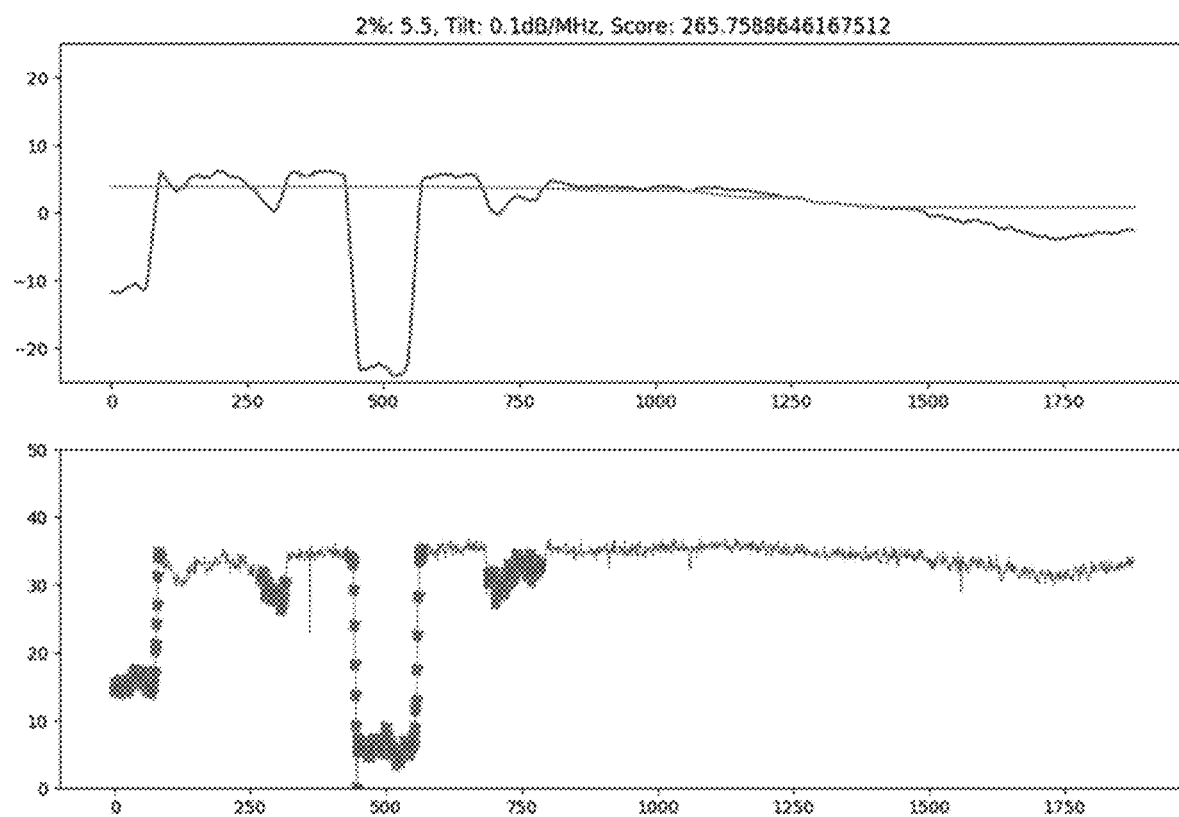
Figure 6:
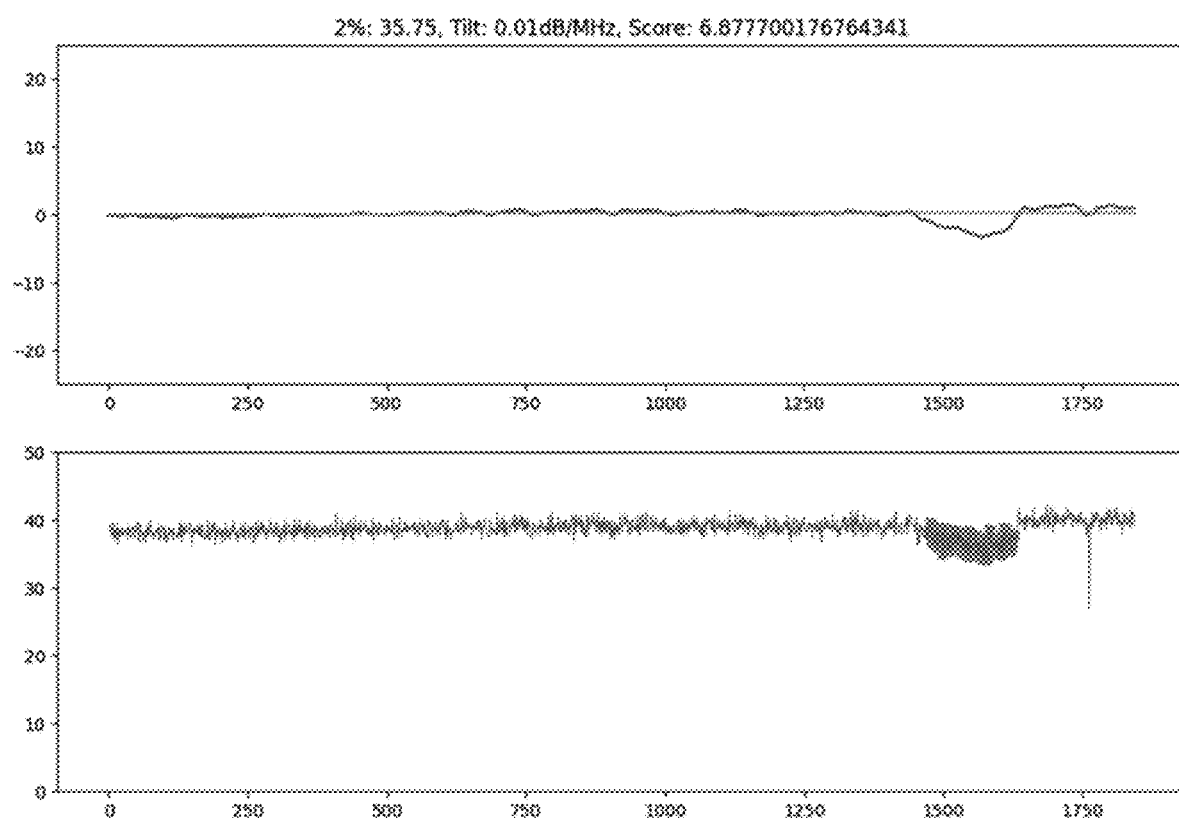
Figure 7:
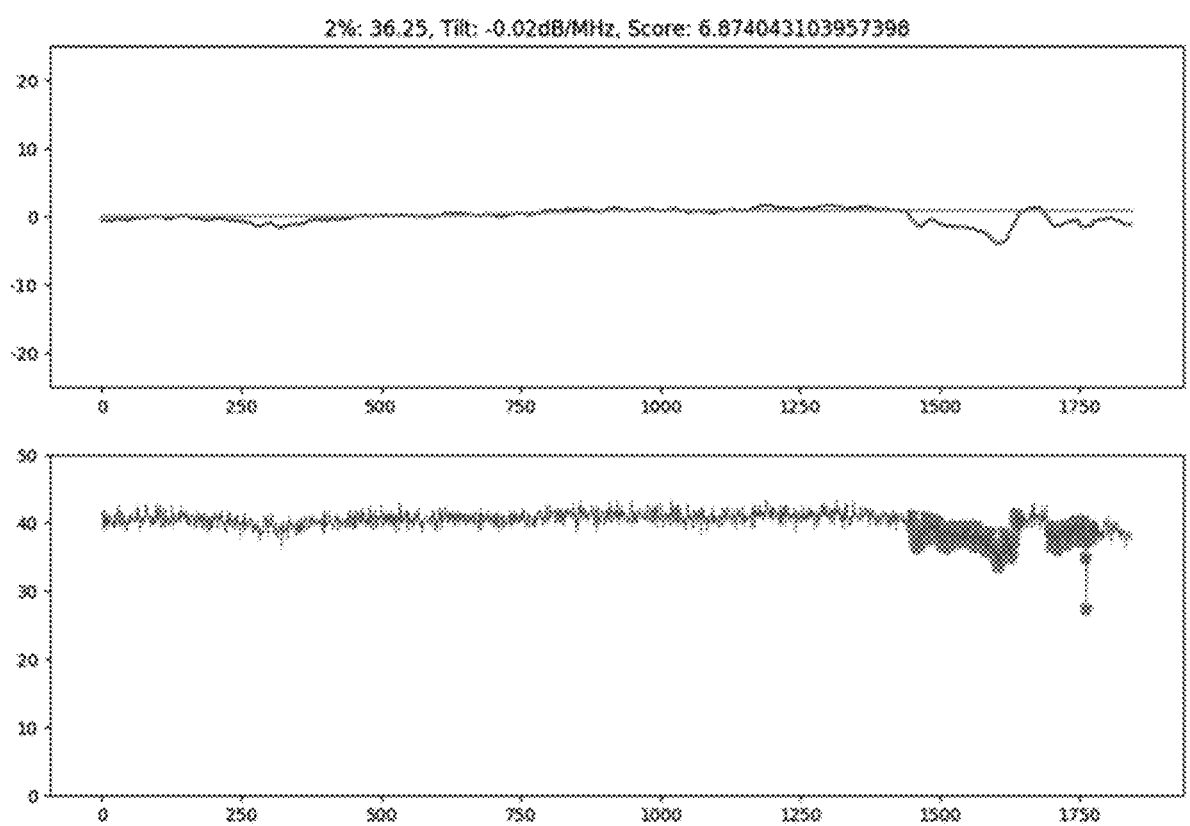
Figure 8:
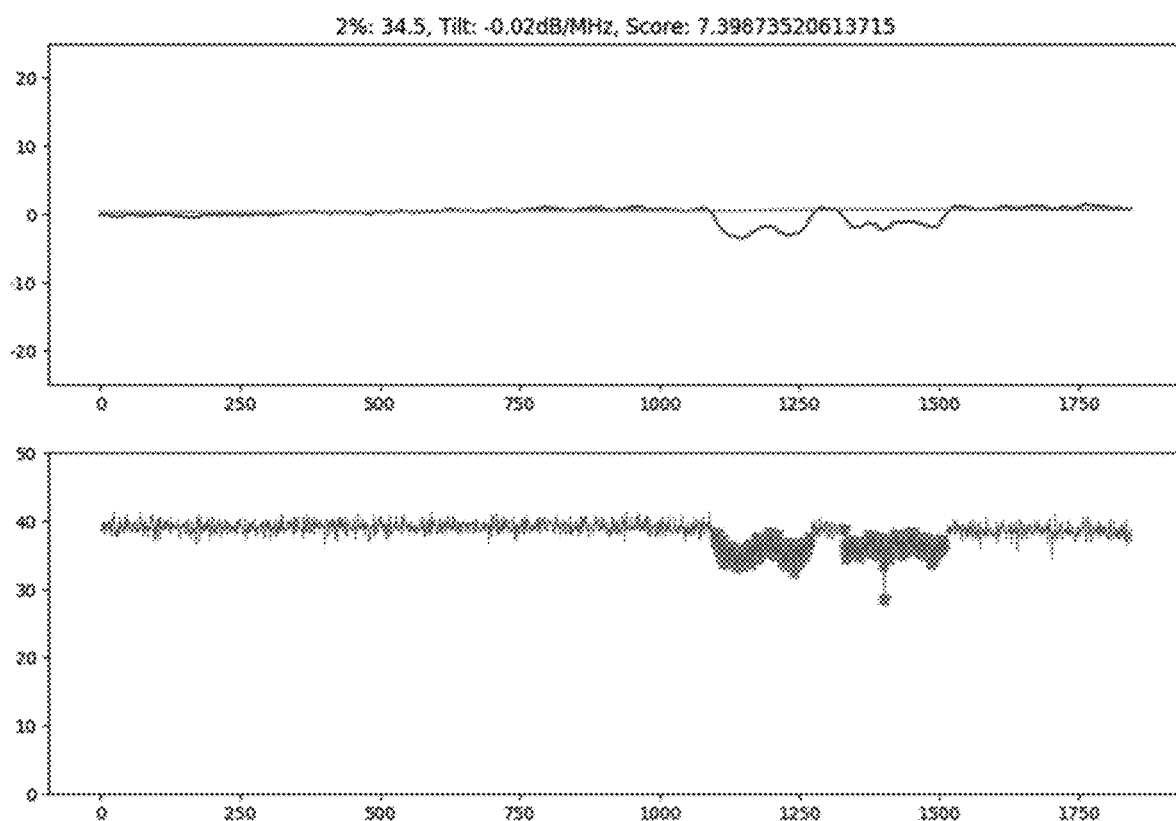
Figure 9:
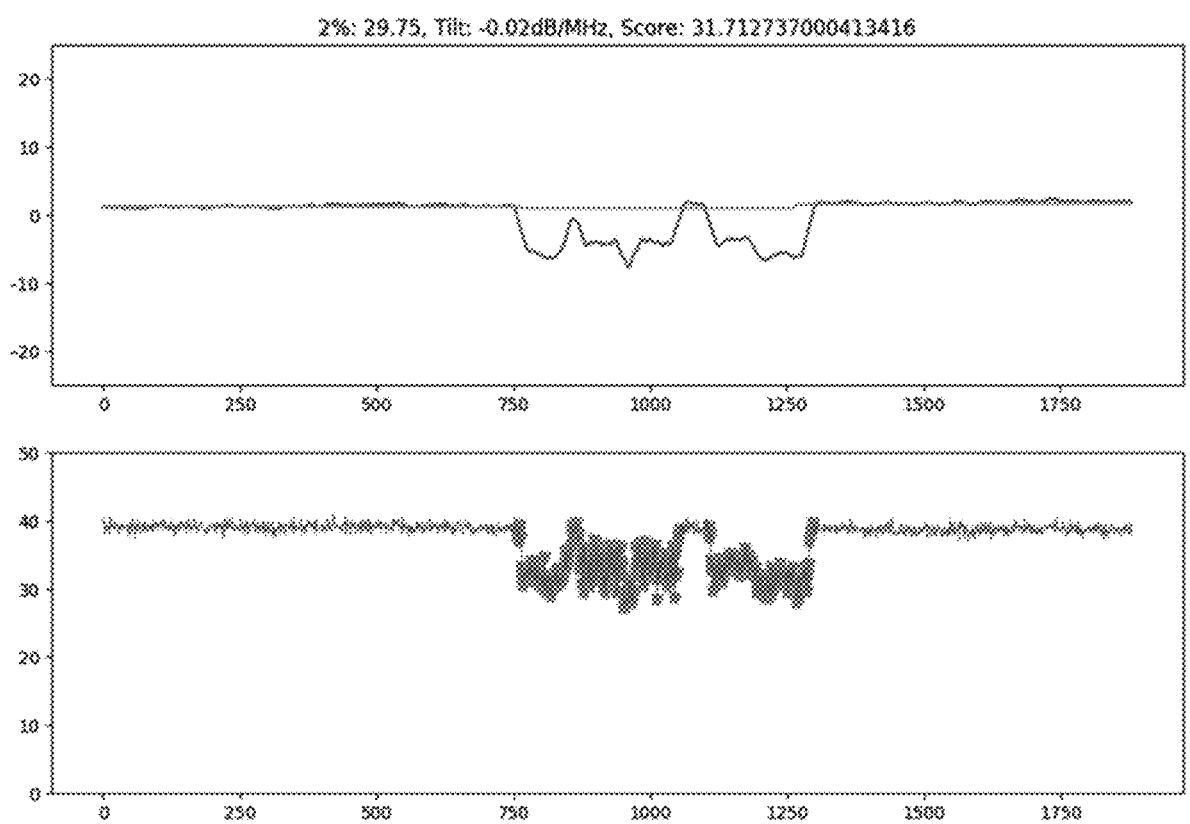
Figure 10:
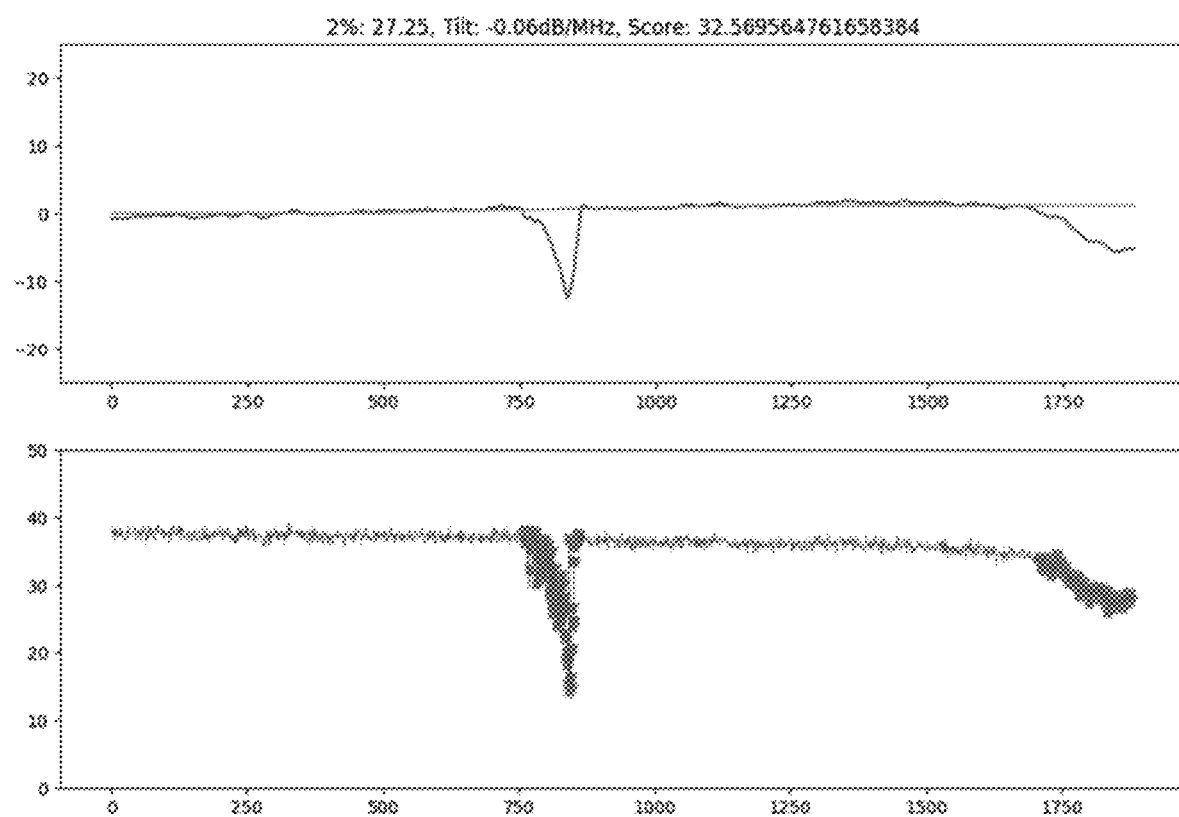
Figure 11:
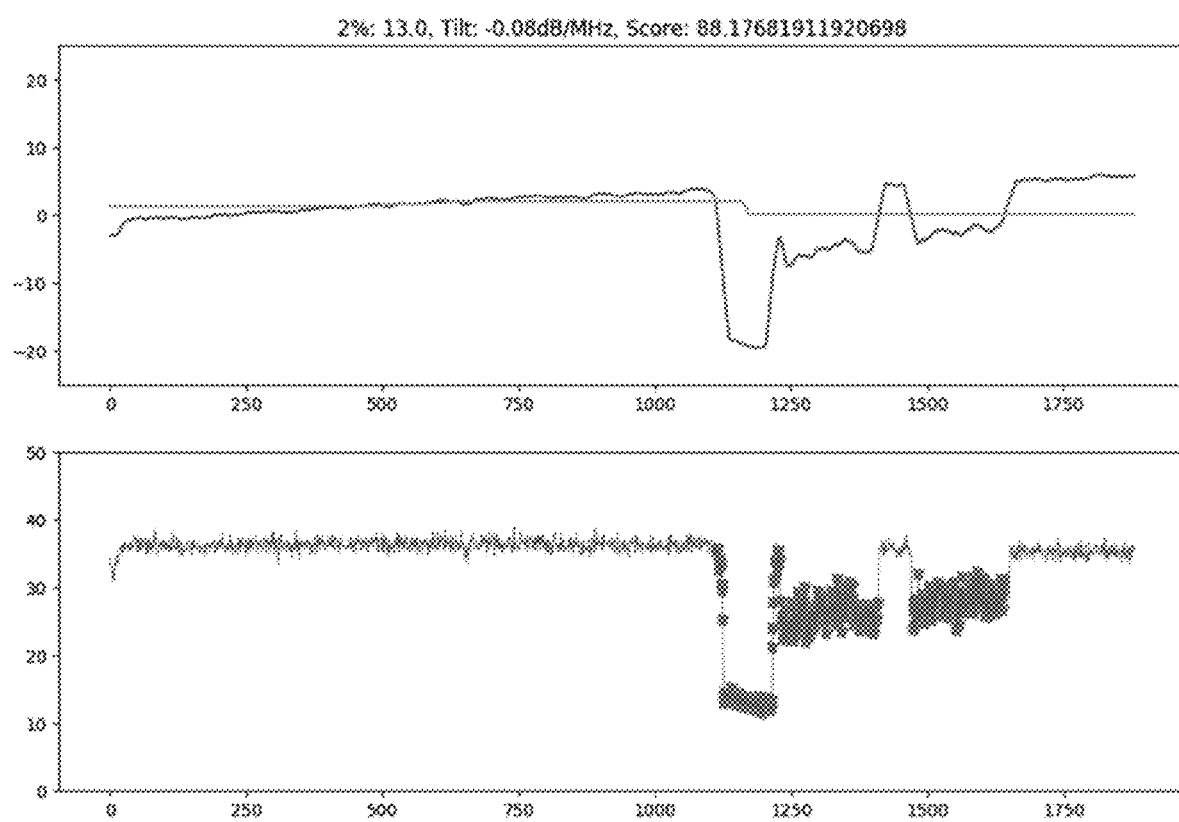
Figure 12:
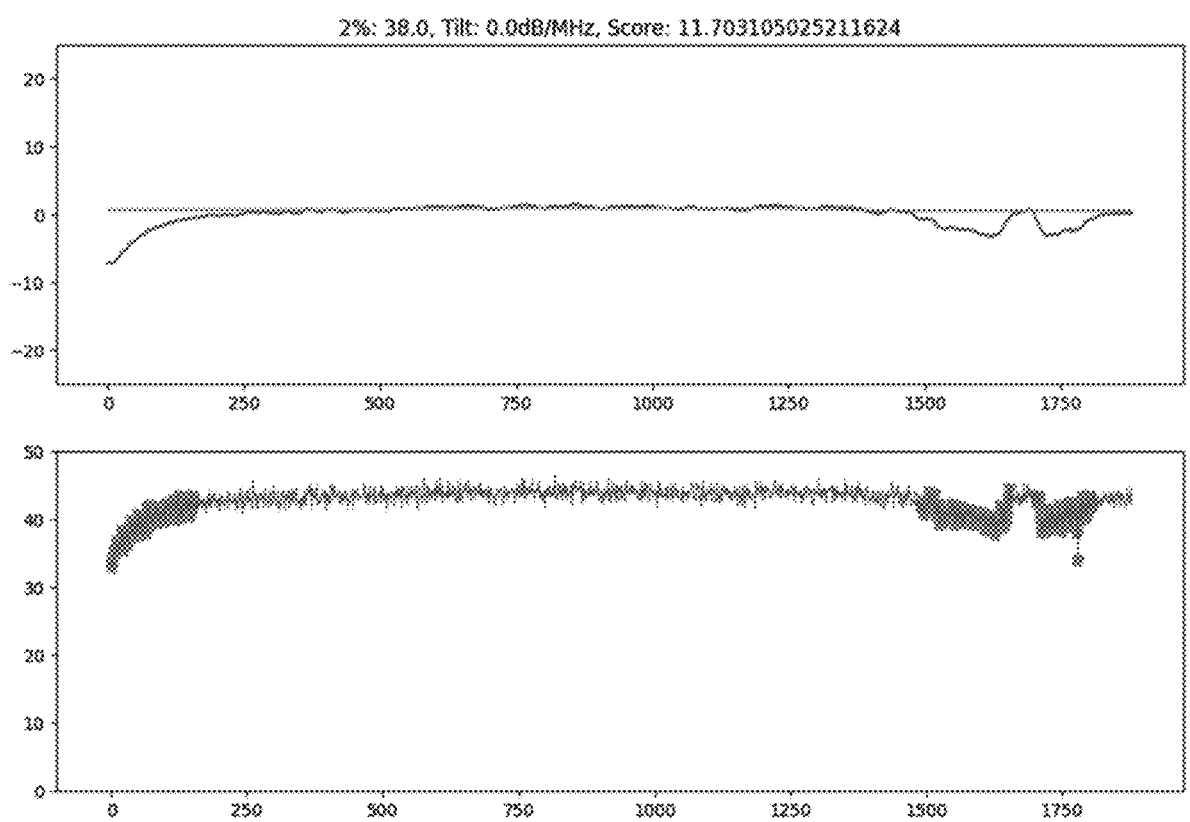

The embodiments herein may be implemented in a variety of ways as a matter of design choice. For example, the invention can take the form of an entirely hardware embodiment, an entirely software embodiment or an embodiment containing both hardware and software elements. In an embodiment, the invention is implemented in software, which includes but is not limited to firmware, resident software, microcode, etc. FIG. 2 illustrates a computing system 200 in which a computer readable medium 206 may provide instructions for performing any of the methods disclosed herein.

Furthermore, the invention can take the form of a computer program product accessible from the computer readable medium 206 providing program code for use by or in connection with a computer or any instruction execution system. For the purposes of this description, the computer readable medium 206 can be any apparatus that can tangibly store the program for use by or in connection with the instruction execution system, apparatus, or device, including the computer system 200.

The medium 206 can be any tangible electronic, magnetic, optical, electromagnetic, infrared, or semiconductor system (or apparatus or device). Examples of a computer readable medium 206 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 200, suitable for storing and/or executing program code, can include one or more processors 202 coupled directly or indirectly to memory 208 through a system bus 210. The memory 208 can include local memory employed during actual execution of the program code, bulk storage, and cache memories which provide temporary storage of at least some program code in order to reduce the number of times code is retrieved from bulk storage during execution. Input/output (I/O) devices 204 (including but not limited to keyboards, displays, pointing devices, etc.) can be coupled to the system either directly or through intervening I/O controllers. Network adapters may also be coupled to the system to enable the computing system 200 to become coupled to other data processing systems, such as through host systems interfaces 212, or remote printers or storage devices through intervening private or public networks. Modems, cable modem and Ethernet cards are just a few of the currently available types of network adapters.

The apparatus, software and methods disclosed herein are further illustrated by the following Examples. These Examples are for illustrative purposes only and are not intended to limit the disclosure.

EXAMPLE 1

MER/Spectrum data in orthogonal frequency domain multiplexing (OFDM) tend to have smooth changes as the normal state rather than having sudden changes over the frequency. The following exemplary steps were used to filter out only the samples with issues from millions of data rows:

1. Use Savitzky-Golay filter to smooth the original data sample;
2. Remove the trend in the sample by subtracting least square fits calculated from sub segments in the sample;
3. Normalize the sample by subtracting the sample's mean value from all values;
4. Calculate a sliding window median of the sample with a window size of num_elements_in_sample//2 and step size 1. Note that 2 priority queues are used in sliding window median calculation for performance boost;
5. Calculate a sliding window standard deviation on the sample with window size, say, 10% of the total number of elements;
6. If the standard deviation of a certain window of elements is greater than the threshold, say 0.95 (based on the window size), calculate a squared-error between each pair of <sliding median element value, original element value> and if the squared-error is greater than a threshold, say 1.5, replace the original element's value by the sliding median element value;
7. Calculate sliding window median again based on the modified sample with a window size of num_elements_in_sample//2 and step size 1;
8. Perform Step 5 and Step 6 again but this time do not change the original element's value and calculate the average from all squared-errors that are greater than the threshold as the final score of this sample;
9. Use another threshold value to finally judge if the sample is having issues, for example, threshold=3.0. The samples with scores greater than the threshold will be marked as samples with issues. Use a least square-fit on the original sample to find out how much tilt there is to make issue marking decisions.

In experiments, the method filtered out 90% (out of all) good samples and kept the ~10 samples with issues, very much reducing the amount of time invested in the initial data analysis phase.

The benefits associated with applying this method include:

1. Fast and accurate data filtering when the original data set is too large for data analysis and feature engineering;
2. The final score represents how severe the issues are in the sample, it can be used for sorting samples based on priority;
3. The method can be readily implemented on a standard computer.

As a sample use case, performance on OFDM downstream Rx MER data was tested. The results are shown in FIGS. 2, 3, 4, 5, 6, 7, 8, 9, 10 and 11, where detrending lines are shown in the top graphs and highlighted areas in the bottom graphs mark identified anomalies/features.

EXAMPLE 2

This Example applies clustering methods such as K-means or Hierarchical clustering with a Dynamic Time Warping algorithm as the core on one or multiple frequency ranges as regions of interest (ROIs) to identify issues or "features" that are being shared by certain groups of CMs. Applying clustering algorithms to the CM MER data does not have to be focused on CMs on the same channels, it can also work on CMs with the same number of active subcarriers. By applying these methods, operators can find CMs that match the selected ROIs and target much smaller CM groups for further analysis quickly. The Mean-Shift algorithm can be used before applying K-means clustering to figure out how many potential clusters exist in the dataset.

Figure 13:
FIG. 13 shows one-dimensional training data comprising an LTE ingress feature, according to an embodiment. The last 100 sub-carriers are selected for clustering.
Figure 14:
FIG. 14 shows one-dimensional training data comprising an MER spike, according to an embodiment. The last 100 sub-carriers are selected for clustering.
Figure 15:
FIG. 15 shows one-dimensional training data that is normal, according to an embodiment. The last 100 sub-carriers are selected for clustering.

FIGS. 13, 14 and 15 show the ROI-focused clustering results. The method efficiently found three groups of CMs displaying features on the highest 5 MHz (100 sub-carriers with 50 KHz spacing). FIG. 13 shows one-dimensional training data comprising an LTE ingress feature. FIG. 14 shows one-dimensional training data comprising an MER spike. FIG. 15 shows one-dimensional training data that is normal. In each case, the last 100 sub-carriers are selected for clustering.

Furthermore, as a use case, assume the task is to find CMs that are getting LTE ingress. Given the CMTS area and CM area, it is possible to find what frequency ranges are owned by which wireless carriers by querying the FCC database with their RESTful APIs. These frequency ranges can then be selected as ROIs and one of the disclosed methods can be applied to quickly filter out CMs that are under impact of LTE signals.

Figure 16:
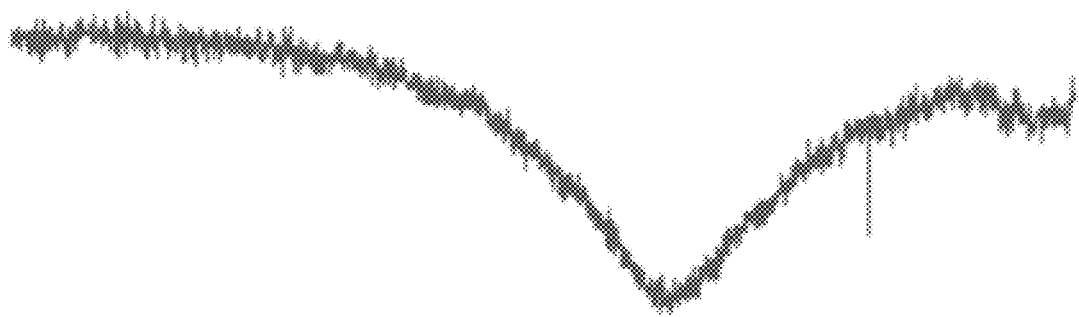
FIG. 16 shows one-dimensional training data displaying a large amplifier suckout feature.
Figure 17:
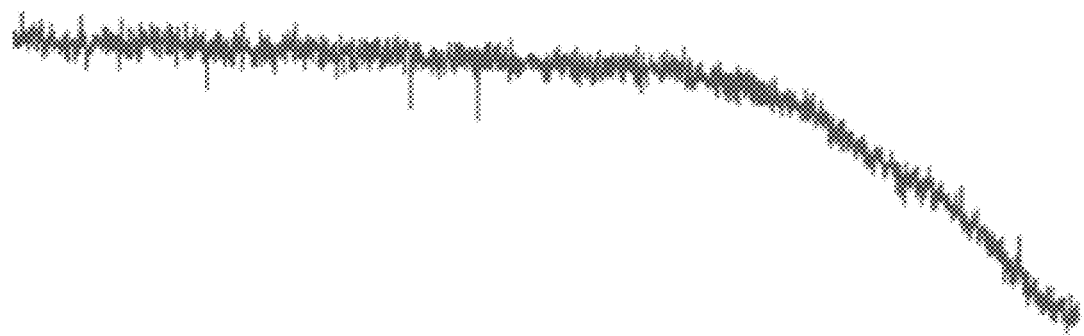
FIG. 17 shows one-dimensional training data displaying a high frequency roll-off feature.

Another use case would be when an amplifier suckout (FIG. 16) or a bad roll-off on CM MER data (FIG. 17) is detected. The disclosed methods can identify what CMs are under the same impact by applying the suckout frequency range or the highest 30 MHz of the channel as ROIs.

The disclosed methods can also be used or compared with other analysis tools/algorithms such as an MER sample filtering algorithm and the data series pattern recognition method disclosed in U.S. patent application Ser. No. 16/577,304, filed Sep. 20, 2019 (CL61358). For example, the MER sample filtering algorithm may be used to filter out 50000 MER samples which contain all types of issue patterns and remove the remaining 950000 good samples to reduce the problem space. Then, this method can be applied on a much smaller group (50000 samples) to more efficiently target the most impactful OFDM channel issues. Finally, a "feature pool" for pattern recognition training and anomaly detection can be created using samples containing identifiable patterns.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for detecting anomalous elements in data comprising:
   generating a data series from a plurality of signals received from one or more cable modems operating on a communication network;
   detrending the data series to obtain an un-tilted data series;
   designating a number of elements within the un-tilted data series as a sliding window;
   moving the sliding window in increments across the un-tilted data series;
   calculating a median and a standard deviation for the sliding window at each increment;
   when the standard deviation for the sliding window at one of the increments is greater than a threshold (SD threshold), identifying anomalous elements within the sliding window;
   replacing the anomalous elements with the median of the sliding window to create a modified sliding window at the one increment;
   calculating a new median and a new standard deviation for the modified sliding window;
   identifying new anomalous elements within the modified sliding window when the new standard deviation is greater than a new SD threshold;
   scoring the data series based on a quantity of the new anomalous elements, a magnitude of the new anomalous elements, or both a quantity and a magnitude of the new anomalous elements;
   when the score is greater than or equal to a specified number, identifying which of the one or more cable modems from which the data series is obtained is an impaired cable modem; and
   transmitting signals to/from the impaired cable modem outside frequencies associated with the new anomalous elements.

2. The method of claim 1, wherein the step of identifying the new anomalous elements comprises:
   determining a squared error between the median for the sliding window and each element within the modified sliding window;
   setting a threshold for the squared error (SE threshold); and
   identifying elements exceeding the SE threshold as the new anomalous elements.

3. The method of claim 2, wherein the magnitude of new anomalous elements is an average, a mean, a median or a sum of all the squared errors exceeding the SE threshold.

4. The method of claim 1, wherein the SD threshold and the new SD threshold are the same or different.

5. The method of claim 1 further comprising classifying the data series as being a patterned data series comprising a feature when the score exceeds a set value.

6. The method of claim 5, wherein the feature is selected from the group consisting of LTE ingress, an MER spike, amplifier suckout, frequency roll-off, wireless interference patterns and combinations thereof.

7. The method of claim 5 further comprising grouping a plurality of the patterned data series into one or more clusters.

8. The method of claim 7 further comprising identifying one or more cable modems transmitting the patterned data series.

9. The method of claim 5 further comprising using the patterned data series to train a machine learning model.

10. The method of claim 1 further comprising a step of normalizing the un-tilted data series.

11. The method of claim 1, wherein the step of detrending comprises substantially removing one or more slopes of the data series.

12. A non-transitory computer-readable medium having a plurality of non-transitory instructions executable with a processor for detecting anomalous elements in data, the plurality of non-transitory instructions being executable for:
   generating a data series from a plurality of signals received from one or more cable modems operating on a communication network;
   detrending the data series to obtain an un-tilted data series;
   designating a number of elements within the un-tilted data series as a sliding window;
   moving the sliding window in increments across the un-tilted data series;
   calculating a median and a standard deviation for the sliding window at each increment;
   when the standard deviation for the sliding window at one of the increments is greater than a threshold (SD threshold), identifying anomalous elements within the sliding window;
   replacing the anomalous elements with the median of the sliding window to obtain a modified sliding window at the one increment;
   calculating a new median and a new standard deviation for the modified sliding window;
   identifying new anomalous elements within the modified sliding window when the new standard deviation is greater than a new SD threshold;
   scoring the data series based on a quantity of the new anomalous elements, a magnitude of the new anomalous elements, or both a quantity and a magnitude of the new anomalous elements;
   when the score is greater than or equal to a specified number, identifying which of the one or more cable modems from which the data series is obtained is an impaired cable modem; and
   transmitting signals to/from the impaired cable modem outside frequencies associated with the new anomalous elements.

13. The non-transitory computer-readable medium of claim 12, wherein identifying the new anomalous elements comprises:
   determining a squared error between the median for the sliding window and each element within the modified sliding window;
   setting a threshold for the squared error (SE threshold); and
   identifying elements exceeding the SE threshold as the new anomalous elements.

14. The non-transitory computer-readable medium of claim 12 further comprising the plurality of non-transitory instructions being executable for classifying the data series as being a patterned data series comprising a feature when the score exceeds a set value.

15. The non-transitory computer-readable medium of claim 14 further comprising the plurality of non-transitory instructions being executable for grouping a plurality of the patterned data series into one or more clusters.

16. The non-transitory computer-readable medium of claim 14 further comprising the plurality of non-transitory instructions being executable for identifying one or more cable modems transmitting the patterned data series.

17. The non-transitory computer-readable medium of claim 14, wherein the feature is selected from the group consisting of LTE ingress, an MER spike, amplifier suckout, frequency roll-off, wireless interference patterns and combinations thereof.

18. The non-transitory computer-readable medium of claim 14 further comprising the plurality of non-transitory instructions being executable for using the patterned data series to train a machine learning model.

\* \* \* \* \*